United States Patent [19]

DiDomenico et al.

[11] Patent Number: 6,093,127
[45] Date of Patent: Jul. 25, 2000

[54] HIGH LATERAL OFFSET FRONT DIFFERENTIAL

[75] Inventors: Ronald L. DiDomenico, Washington; Shawn E. Bronner, Detroit; Mark W. Houy, Canton, all of Mich.; Mark A. Kamm, Toledo, Ohio; Gary J. Engelman, Royal Oak, Mich.; Jeffrey J. Japinga, West Bloomfield, Mich.; William C. Freigruber, Macomb, Mich.

[73] Assignee: DaimlerChrysler Corporation, Auburn Hills, Mich.

[21] Appl. No.: 09/215,180

[22] Filed: Dec. 17, 1998

[51] Int. Cl.$^7$ .................................................. F16H 48/06
[52] U.S. Cl. .............................. 475/230; 74/409; 74/424
[58] Field of Search ...................... 475/230, 222, 475/246, 220; 74/409, 607, 424; 180/375, 378

[56] References Cited

U.S. PATENT DOCUMENTS

| | | | |
|---|---|---|---|
| Re. 24,870 | 9/1960 | Butler | 188/72.5 |
| 1,326,655 | 12/1919 | Frins | 475/230 |
| 2,142,575 | 1/1939 | Spicacci | 475/230 X |
| 2,193,431 | 3/1940 | Probst | 74/424 |
| 2,529,392 | 11/1950 | Herreshoff | 475/230 X |
| 2,578,155 | 12/1951 | Slider | 475/230 X |
| 3,758,129 | 9/1973 | Ishikawa et al. | 180/259 |
| 3,780,834 | 12/1973 | Lottridge et al. | 188/18 A |
| 3,788,429 | 1/1974 | Brooks et al. | 188/18 A |
| 3,861,501 | 1/1975 | Brooks et al. | 188/18 A |
| 3,901,103 | 8/1975 | Hufstader | 475/230 X |
| 3,941,221 | 3/1976 | Pringle | 188/218 XL |
| 4,049,085 | 9/1977 | Blunier | 188/18 A |
| 4,061,213 | 12/1977 | Davy | 188/181 R |
| 4,673,064 | 6/1987 | Will | 188/18 A |
| 4,779,698 | 10/1988 | Iwata | 475/230 X |
| 4,792,020 | 12/1988 | Okumura et al. | 188/18 A |
| 4,986,608 | 1/1991 | Fett | 301/124.1 |
| 5,137,123 | 8/1992 | Setogawa et al. | 188/264 AA |
| 5,293,686 | 3/1994 | Martin et al. | 475/230 X |
| 5,328,252 | 7/1994 | Thompson | 301/64.4 |
| 5,507,367 | 4/1996 | Dagh et al. | 188/18 A |
| 5,603,554 | 2/1997 | Monroe et al. | 301/105.1 |
| 5,806,371 | 9/1998 | Hibbler et al. | 475/230 X |

FOREIGN PATENT DOCUMENTS

2210341  7/1989  United Kingdom ..................... 74/424

*Primary Examiner*—Charles A Marmor
*Assistant Examiner*—Ankur Parekh
*Attorney, Agent, or Firm*—Roland A. Fuller, III

[57] ABSTRACT

A differential assembly for a vehicle having a housing and a differential mechanism rotatably mounted in the housing. The differential mechanism includes a support shaft transversely disposed therein for supporting a pair of rotating cross gears. The rotation of the differential mechanism defines a differential spin axis and a support shaft spin plane. A pinion gear is also provided for rotatably driving the differential mechanism. The pinion gear extends from the housing and defines a pinion spin axis. The pinion spin axis is parallel to and offset from the support shaft spin plane. A pair of opposing bearings are then provided for rotatably supporting the differential mechanism. The pair of bearings is disposed in the housing, wherein one of the pair of bearings is substantially aligned with the pinion spin axis. This arrangement minimizes the size of the front differential and further improves the ground clearance and suspension travel of the vehicle.

15 Claims, 8 Drawing Sheets

HIGH LATERAL OFFSET FRONT DIFFERENTIAL

FIELD OF THE INVENTION

The present invention generally relates to differential assemblies and, more particularly, to a front differential assembly having a high lateral offset for use with an independent suspension.

BACKGROUND OF THE INVENTION

Differentials are commonly used in motor vehicle drivetrains to transmit torque from a vehicle transmission to the driven wheels of the vehicle. Traditionally, differentials of the type used in automotive drivetrains generally include a differential housing or carrier assembly, a differential casing, and a planetary differential gearset. The planetary gearset is supported within the differential casing to facilitate relative rotation (i.e., speed differentiation) between a pair of differential output shafts. The planetary gearset typically includes helical or beveled side gears fixed to the end of the differential output shafts. The helical side gears are typically meshed with a pair of helical cross gears. Each differential output shaft is supported by a differential thrust bearing and is further coupled to the corresponding driven wheel of the vehicle using a constant-velocity (CV) joint and a half shaft.

In a front-wheel drive application, rotary power or torque is transferred from the engine of the vehicle to the driven wheels through the transmission or transfer case and a front differential assembly. Specifically, torque from the engine is applied to an output shaft of the transmission. The transmission output shaft is coupled to a propeller shaft or transfer case such that torque may be transmitted from the transmission or transfer case to a drive pinion shaft of the front differential assembly. The drive pinion shaft includes a pinion gear, which is adapted to operably engage a ring gear of the differential casing to enable rotation of the differential casing about a differential spin axis. A cross gear support shaft is further disposed transversely in the differential casing relative to the differential spin axis for supporting a pair of cross gears therein. The pinion gear rotates the differential casing causing torque to be transmitted to the cross gear support shaft. The cross gear support shaft then transmits torque to the pair of cross gears. The cross gears are adapted to differentially applying torque to the pair of opposing differential output shafts in response to various driving conditions, such as wheel slippage or vehicle cornering. Each of the differential output shafts is coupled to a respective half shaft using a constant-velocity (CV) joint to complete the transfer of torque to the driven wheels.

In conventional designs, the differential thrust bearings are positioned on opposing sides of the differential housing to support the rotation of both the pair of differential output shafts and the differential casing. Specifically, these differential thrust bearings are positioned outside a cylindrical boundary defined by the pinion gear in order to allow the pinion gear to be inserted into the differential assembly from the front during assembly. However, due to the distance between the differential thrust bearings, the size of the differential housing is increased, thereby reducing the ground clearance of the vehicle. Moreover, due to the distance between the differential thrust bearings, the length of the half shafts must be reduced, which limits the travel of the vehicle suspension. It should be appreciated that the effect of reduced ground clearance and suspension travel limits the use of these conventional designs in off road applications.

Conventional front differential designs further have the disadvantage of having a plan view angle between the propeller shaft and the drive pinion shaft, also known as the prop plan view angle, greater than 1.5°. It is believed that a prop plan view angle greater than 1.5° induces a second order vibration in the propeller shaft. This second order vibration may accelerate wear in the drivetrain and further effect the comfort of the vehicle occupants.

Accordingly, there exists a need in the relevant art to provide a differential assembly capable of minimizing the distance between the differential thrust bearings in order to maximize the length of the half shafts and minimize the size of the differential housing for improved ground clearance and suspension travel. Furthermore, there exists a need in the relevant art to provide a differential assembly capable of minimizing the plan view angle between the propeller shaft and the drive pinion shaft. Still further, there exists a need in the relevant art to provide a differential assembly capable of reducing the cost and complexity of the drivetrain design.

SUMMARY OF THE INVENTION

In accordance with the broad teachings of this invention, a differential assembly having an advantageous construction is provided.

It is an object of the present invention to provide a front differential assembly for an independent suspension capable of minimizing the distance between the differential thrust bearings in order to maximize the length of the output half shafts and further minimize the size of the differential housing. It is yet another object of the present invention to provide a differential assembly capable of minimizing the plan view angle between the propeller shaft and the drive pinion shaft. It is still another object of the present invention to provide adjustment means for controlling the backlash and preload in the differential assembly.

According to the teachings of the present invention, a differential assembly for a vehicle is provided having a housing and a differential mechanism rotatably mounted in the housing. The differential mechanism includes a support shaft transversely disposed therein for supporting a pair of rotating cross gears. The rotation of the differential mechanism defines a differential spin axis and a support shaft spin plane. A pinion gear is also provided for rotatably driving the differential mechanism. The pinion gear extends from the housing and defines a pinion spin axis. The pinion spin axis is parallel to and offset from the support shaft spin plane. A pair of opposing bearings are then provided for rotatably supporting the differential mechanism. The pair of bearings is disposed in the housing, wherein one of the pair of bearings is substantially aligned with the pinion spin axis. This arrangement minimizes the size of the front differential and further improves the ground clearance and suspension travel of the vehicle.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses. For example, the differential assembly disclosed herein is directed to a front-wheel drive application, however the differential assembly of the present invention may have utility in various other drivetrain applications such as rear-wheel drive and four-wheel drive applications. Moreover, the differential assembly disclosed herein may be coupled with either a manual or automatic transmission. Thus, the differential assembly of the present invention may be utilized in a wide variety of designs and is not intended to be specifically limited to the particular application recited herein.

Figure 1A:
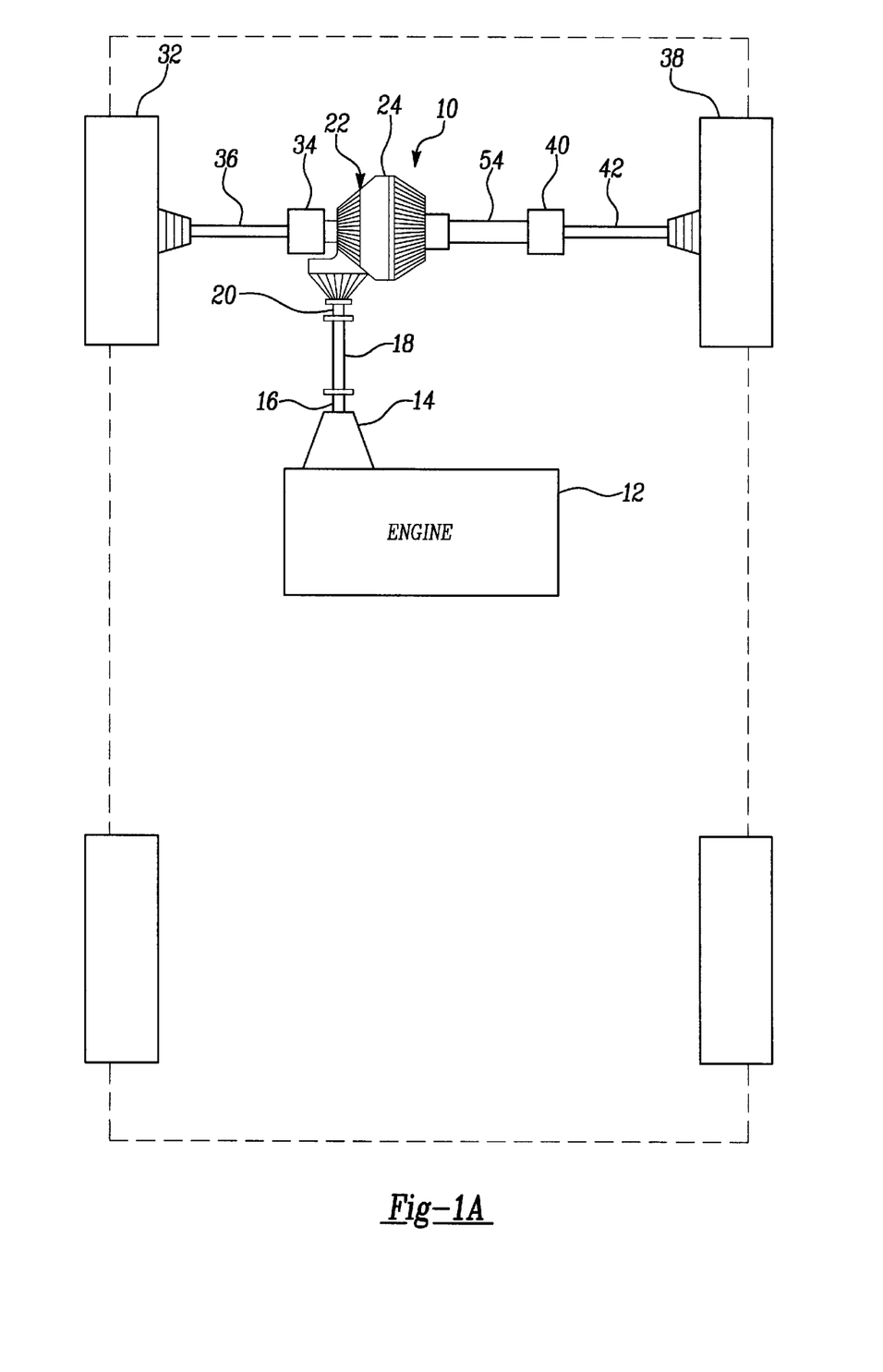
FIG. 1a is a schematic view of an exemplary motor vehicle having a front-wheel drivetrain into which the front differential assembly of the present invention is incorporated.
Figure 1B:
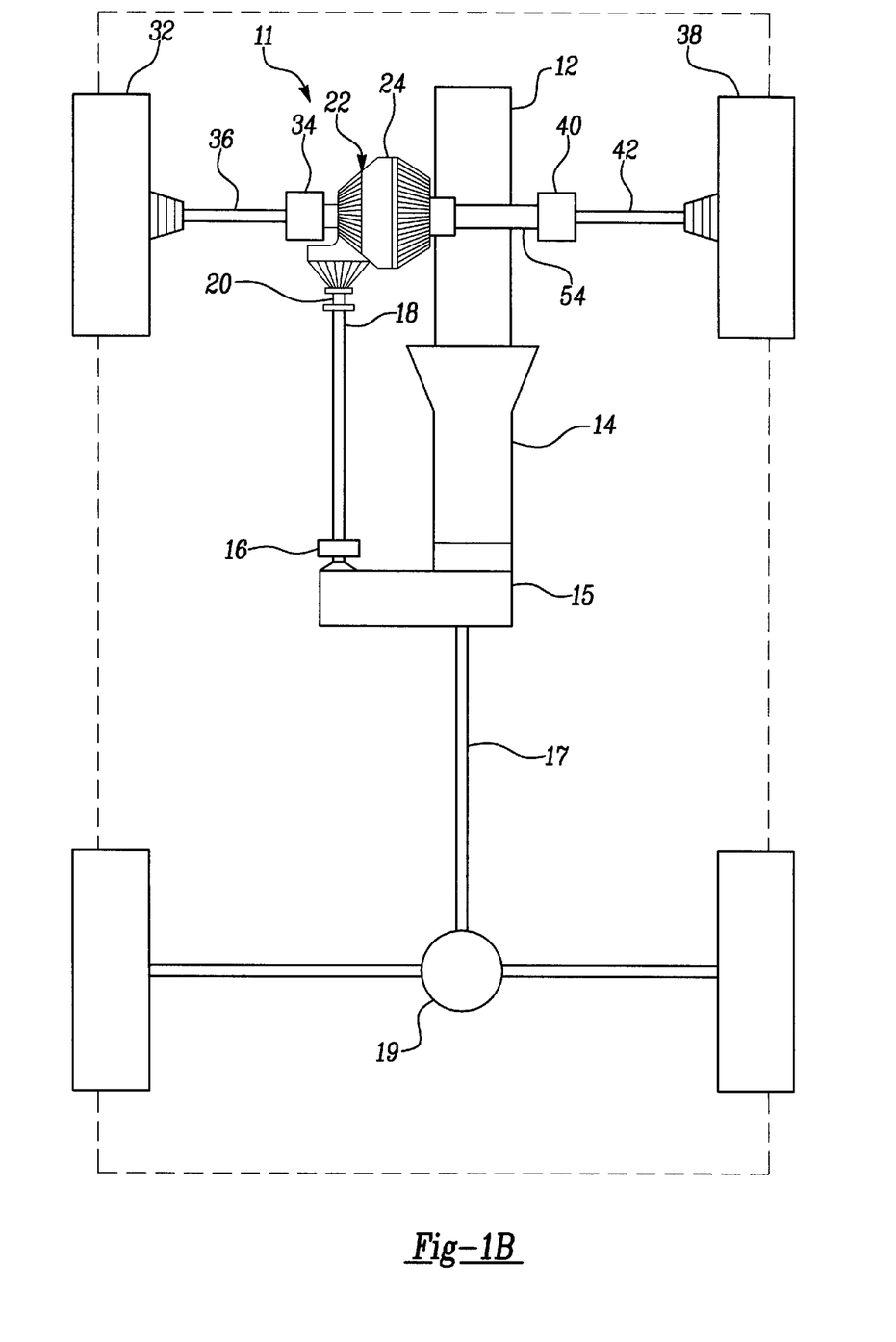
FIG. 1b is a schematic view of an exemplary motor vehicle having a four-wheel drivetrain into which the front differential assembly of the present invention is incorporated.
Figure 2:
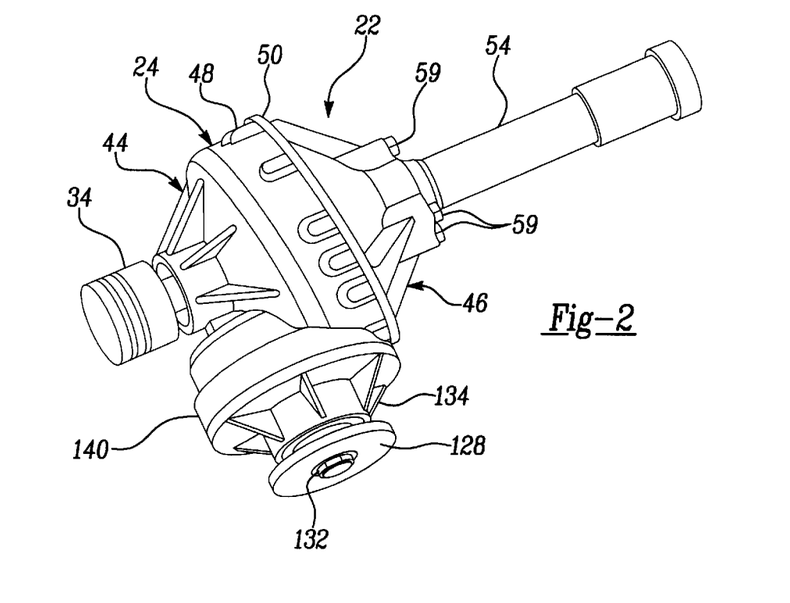
FIG. 2 is a perspective view of the front differential assembly according to the present invention.
Figure 3:
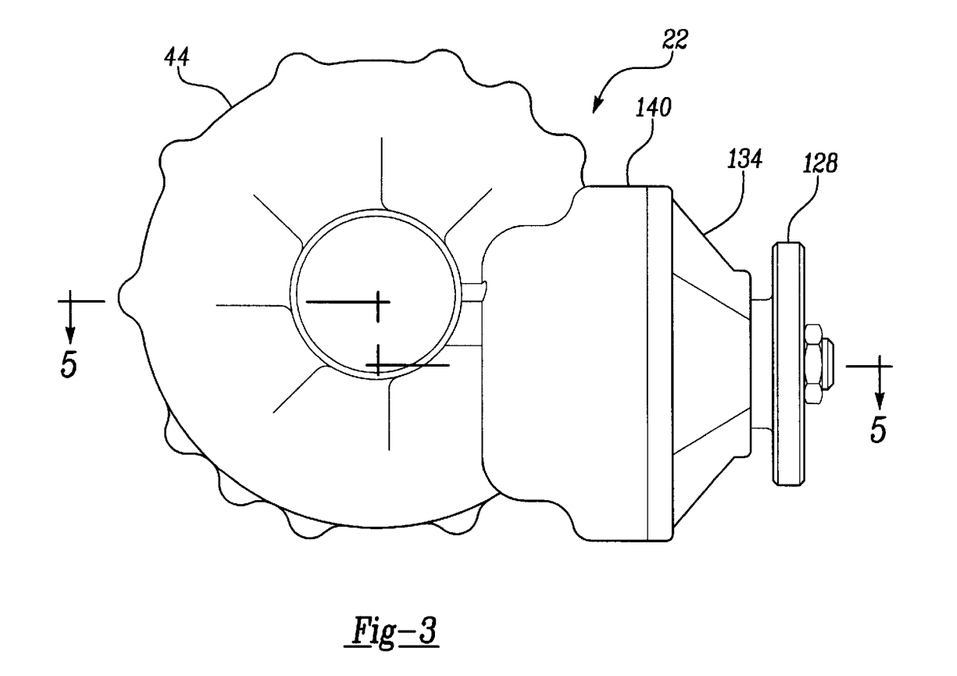
FIG. 3 is a left view of the front differential assembly.
Figure 4:
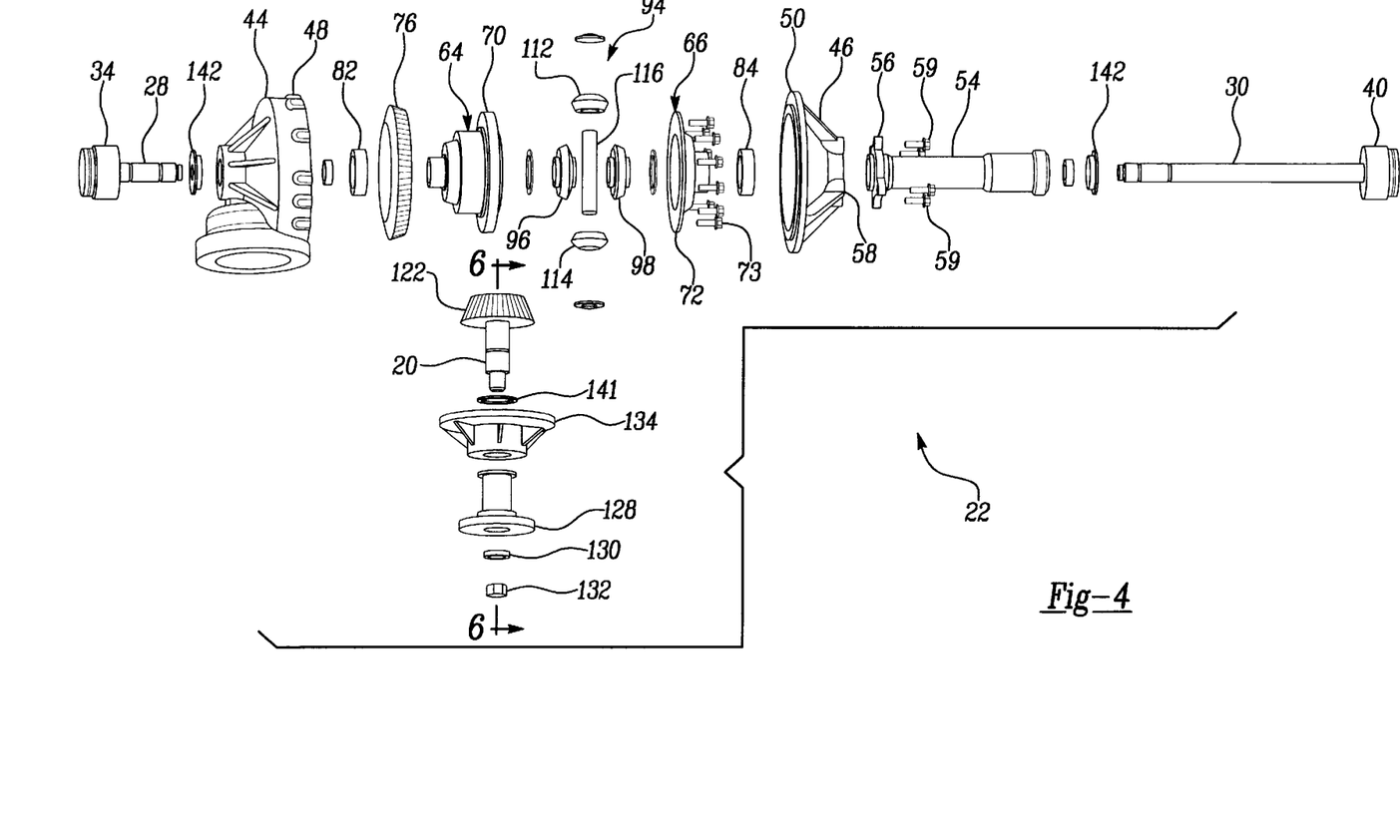
FIG. 4 is an exploded perspective view of the front differential assembly shown in FIG. 2.
Figure 5:
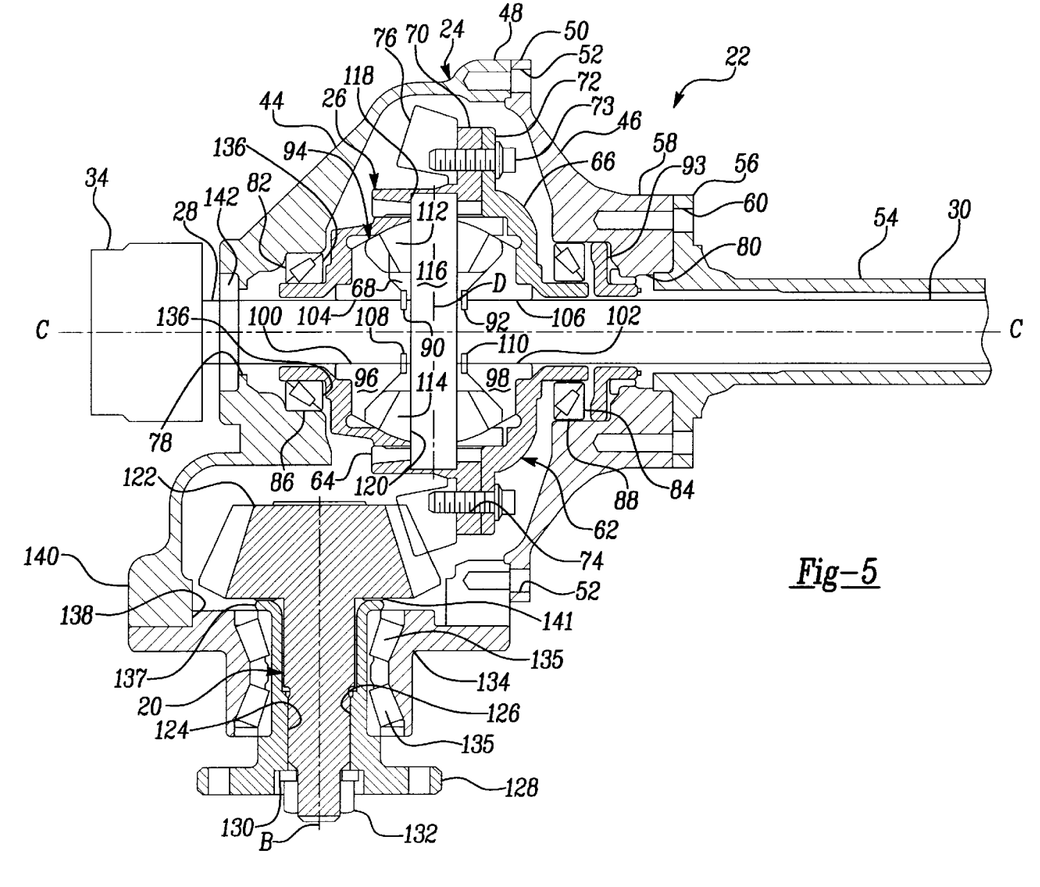
FIG. 5 is a cross-sectional view of FIG. 3, taken along line 5—5, of the front differential assembly.

With particular reference to FIG. 1a, a front-wheel drivetrain 10 for an exemplary motor vehicle is shown to include an engine 12, a transmission 14 having an output shaft 16, and a propeller shaft 18 connecting the transmission output shaft 16 to a drive pinion shaft 20 of a front differential assembly 22. Similarly, as seen in FIG. 1b, a four-wheel drivetrain 11 is shown further having a transfer case 15, a rear output shaft 17, and a rear differential 19 incorporating the differential of the present invention. As best seen in FIG. 5, front differential assembly 22 includes a differential housing or carrier assembly 24, a differential mechanism 26 supported in differential housing 24, and a pair of differential output shafts 28 and 30. Differential output shaft 28 is interconnected to left front wheel 32 through a constant-velocity (CV) joint 34 and a half shaft 36. Similarly, differential output shaft 30 is interconnected to right front wheel 38 through a constant-velocity (CV) joint 40 and a half shaft 42.

Referring to FIGS. 2–5, the construction of differential housing 24 of front differential assembly 22 is described in detail. Differential housing 24 includes a main housing 44 and a housing cover 46 having respective external flanges 48, 50. External flanges 48, 50 are secured together by a plurality of bolts (not shown) extending through first aligned mounting bores 52. Front differential assembly 22 further includes an axle tube 54 having an axle flange 56. Axle flange 56 is secured to a second external flange 58 of housing cover 46 by a plurality of bolts 59 extending through second aligned mounting bores 60.

Still referring to FIGS. 2–5, differential mechanism 26 includes a differential casing 62 having a main drum or body 64 and an end cap 66 defining an internal volume 68. Differential casing 62 is preferably made from ductile iron or aluminum. Main drum 64 and end cap 66 include respective mating radial flanges 70, 72, which are secured together by a plurality of bolts 73 extending through third aligned mounting bores 74. A bevel or ring gear 76 is fixed to radial flange 70 of differential casing 62 using bolts 73 to transfer rotary power or torque thereto. Preferably, ring gear 76 is 8.75" in diameter. Differential housing 24 defines a pair of axially aligned openings 78, 80. A first differential thrust bearing 82 and a second differential thrust bearing 84 are press-fit into respective bearing cavities 86, 88 of differential housing 24, thereby eliminating the need for bearing caps and fasteners. Differential thrust bearings 82, 84 are axially aligned with the pair of openings 78, 80 and are adapted to receive and rotatably support the end segments of differential output shafts 28, 30. The end segments of differential output shafts 28, 30 include a corresponding recessed annular groove 90, 92. An adjuster 93 is positioned adjacent to differential thrust bearing 84 to facilitate adjustment of differential thrust bearings 82, 84. Adjuster 93 further provides a means to control backlash and preload. Shaft seals 142 are disposed about output shafts 28, 30 to seal and contain lubrication fluid within main housing 44.

Differential mechanism 26 further includes a planetary gearset 94 adapted to transfer torque from differential casing 62 to differential output shafts 28, 30 in a manner facilitating speed differentiation therebetween. Gearset 94 is disposed in internal volume 68 and includes a pair of side gears 96, 98. Side gears 96, 98 have internal splines 100, 102 engaging external splines 104, 106 on corresponding differential output shafts 28, 30. Retainers 108, 110 are retained in annular grooves 90, 92 of differential output shafts 28, 30. Retainers 108, 110 axially position and restrain differential output shafts 28, 30. It is also anticipated, however, that side gear shims may be disposed between side gears 96, 98 and the end wall surfaces of differential casing 62 to further insure proper alignment of side gears 96, 98 and reduce internal friction.

Gearset 94 also includes a pair of cross gears 112, 114 rotatably supported by a cross gear support shaft 116. Support shaft 116 extends through a pair of transversely aligned openings 118, 120 formed in main drum 64 of differential casing 62 and in communication with internal volume 68. Each cross gear 112, 114 is adapted to engage both side gears 96, 98 such that speed differentiation may be facilitated between differential output shafts 28, 30.

Figure 6:
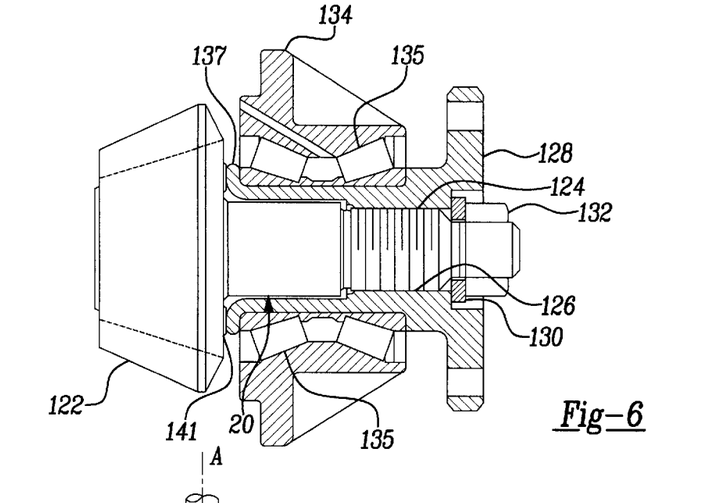
FIG. 6 is a cross-sectional view of the hub and pinion unit of FIG. 4, taken along line 6—6.

As mentioned above, front differential assembly 22 includes drive pinion shaft 20. Drive pinion shaft 20 has a pinion gear 122 fixed thereto which drives ring gear 76 to transfer torque from propeller shaft 18 to differential mechanism 26. Pinion gear 122 includes an external spline 124 engaging an internal spline 126 on a flange or yoke 128. Pinion gear 122 positioning for optimal meshing with ring gear 76 is accomplished by using pinion gear positioning shim 141. Pinion gear 122 and yoke 128 are secured together using a washer 130 and a fastener 132, thereby defining a pinion-yoke assembly. The pinion-yoke assembly is coupled with a hub unit 134 to enable the pinion-yoke assembly and hub unit 134 to be a self-retained, pre-assembled unit adapted to be secured to main housing 44 of front differential assembly 22. As best seen in FIGS. 5 and 6, such self-retainment of the pinion-yoke assembly and hub unit 134 is accomplished by assembling hub 134 on yoke 128 with a pair of tapered roller bearing units 135 therebetween. An end portion 137 of yoke 128 is then bent radially outward to secure hub 134 and bearing units 135 in place. Drive pinion shaft 20 is then inserted through the central opening in hub 134 and washer 130 and fastener 132 are engaged with drive pinion shaft 20. Hub 134 is then mounted to main housing 44 using a plurality of fasteners (not shown).

Figure 7:
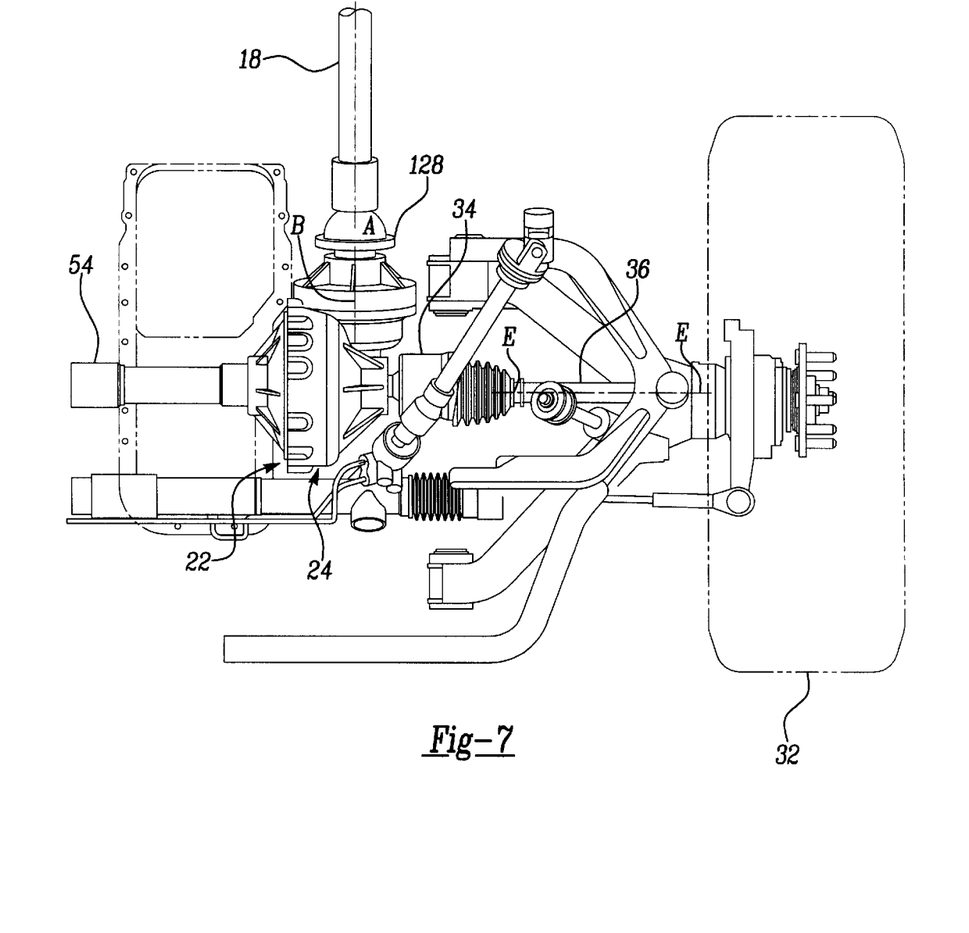
FIG. 7 is a top plan view of the left front section of the vehicle showing the front differential assembly of the present invention incorporated therein.

In operation, power from engine 12 is transmitted through transmission 14 and transmission output shaft 16 to propeller shaft 18, thereby providing rotary power or torque. Rotation of propeller shaft 18 defines a propeller spin axis A. Propeller shaft 18 is coupled to drive pinion shaft 20 using yoke 128 to transmit torque to drive pinion shaft 20. Rotation of drive pinion shaft 20 defines a drive pinion spin axis B. As best seen in FIG. 7, the plan view angle between propeller spin axis A and drive pinion spin axis B is substantially 0°.

It should be appreciated that a prop plan view angle greater than 1.5° is believed to induce second order vibrations in the propeller shaft, which may accelerate wear in the drivetrain and further effect the comfort of the vehicle occupants. Consequently, the plan view angle of 0° of the present invention enables full-time use in four-wheel drive applications without the disadvantages associated with conventional designs.

As best seen in FIG. 5, differential thrust bearing 82 is substantially aligned with drive pinion spin axis B, such that if pinion gear 122 and drive pinion shaft 20 were installed from the front of the vehicle or from inside differential housing 24, interference between differential thrust bearing 82 and pinion gear 122 would result. It is anticipated that differential thrust bearing 82 may be positioned at any one of numerous locations generally defined by a cylindrical boundary axially aligned and substantially equal to the outer diameter of pinion gear 122.

Rotation of drive pinion shaft 20 and pinion gear 122 is then transmitted to ring gear 76 of differential mechanism 26, thereby causing differential casing 62 to rotate about a differential spin axis C. Differential spin axis C is generally perpendicular to drive pinion spin axis B. The rotation of differential casing 62 rotates support shaft 116 and cross gears 112, 114. Such rotation defines a support shaft spin plane D that is generally perpendicular to differential spin axis C and generally parallel and laterally offset from drive pinion spin axis B. The lateral offset between drive pinion spin axis B and support shaft spin plane D ranges generally from 2.04 to 2.18 inches, and more preferably 2.11 inches. As best seen in FIG. 5, drive pinion spin axis B is generally aligned with an interior edge 136 of first differential thrust bearing 82.

Figure 8:
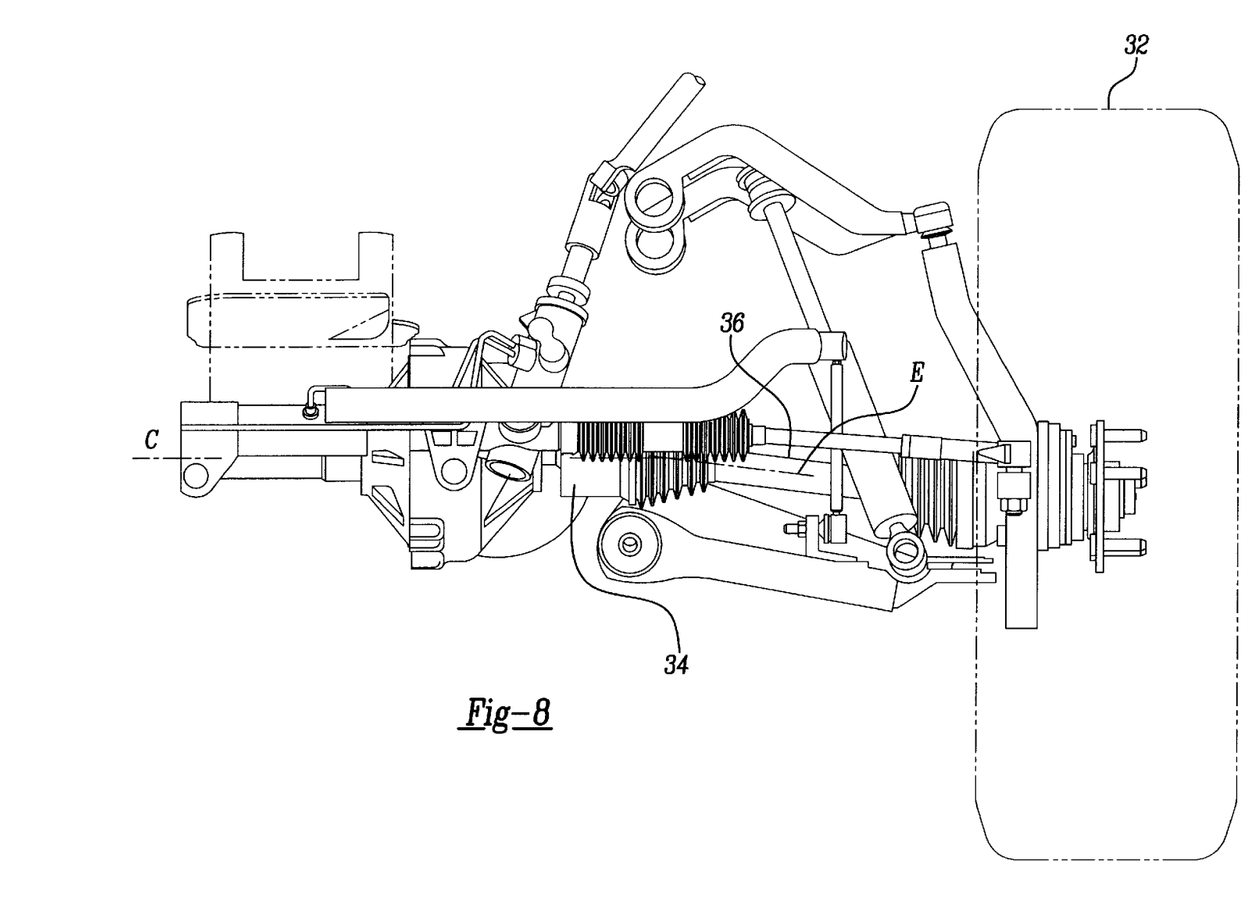
FIG. 8 is a front view, similar to FIG. 7, of the front differential assembly.

Torque is further transmitted from cross gears 112, 114 through side gears 96, 98 to differential output shafts 28, 30. Such torque is directly transferred through corresponding CV joints 34, 40 to half shafts 36, 42 and driven wheels 32, 38. As best seen in FIG. 8, rotation of half shafts 36, 42 defines a half shaft spin axis E (only one shown). The front view angle between the differential spin axis C and the half shaft spin axis E, also known as the CV running angle, is approximately 6.2°.

It should be appreciated that a CV running angle greater than 8° is believed to induce second order vibrations in the half shafts, which may adversely effect the performance and durability of the vehicle.

As described above, it is desirable to have a small plan view angle between propeller spin axis A and drive pinion spin axis B, and a small front view angle between differential spin axis C and half shaft spin axis E. It is also desirable to have long half shafts for improved wheel travel and suspension. This dictates that the thrust bearings should be narrowly located. To this end, the present invention enables the differential thrust bearings to be moved approximately 2½" toward the centerline of the vehicle relative to conventional designs. More particularly, the differential thrust bearings of the present invention are spaced apart approximately 5" on center. In order to accommodate the narrow location of the differential thrust bearings 82, 84, drive pinion shaft 20 is mounted from the outside as a self-retained assembly mounted to main housing 44. In conventional designs, the thrust bearings are spaced wider apart and allow the drive pinion shaft to be inserted through the differential housing from the inside. However, main housing 44 includes an opening 138 that is large enough so that pinion gear 122 can be inserted therethrough. Hub unit 134 is secured to a flange 140 of main housing 44 such that pinion gear 122 operably engages ring gear 76.

Figure 9:
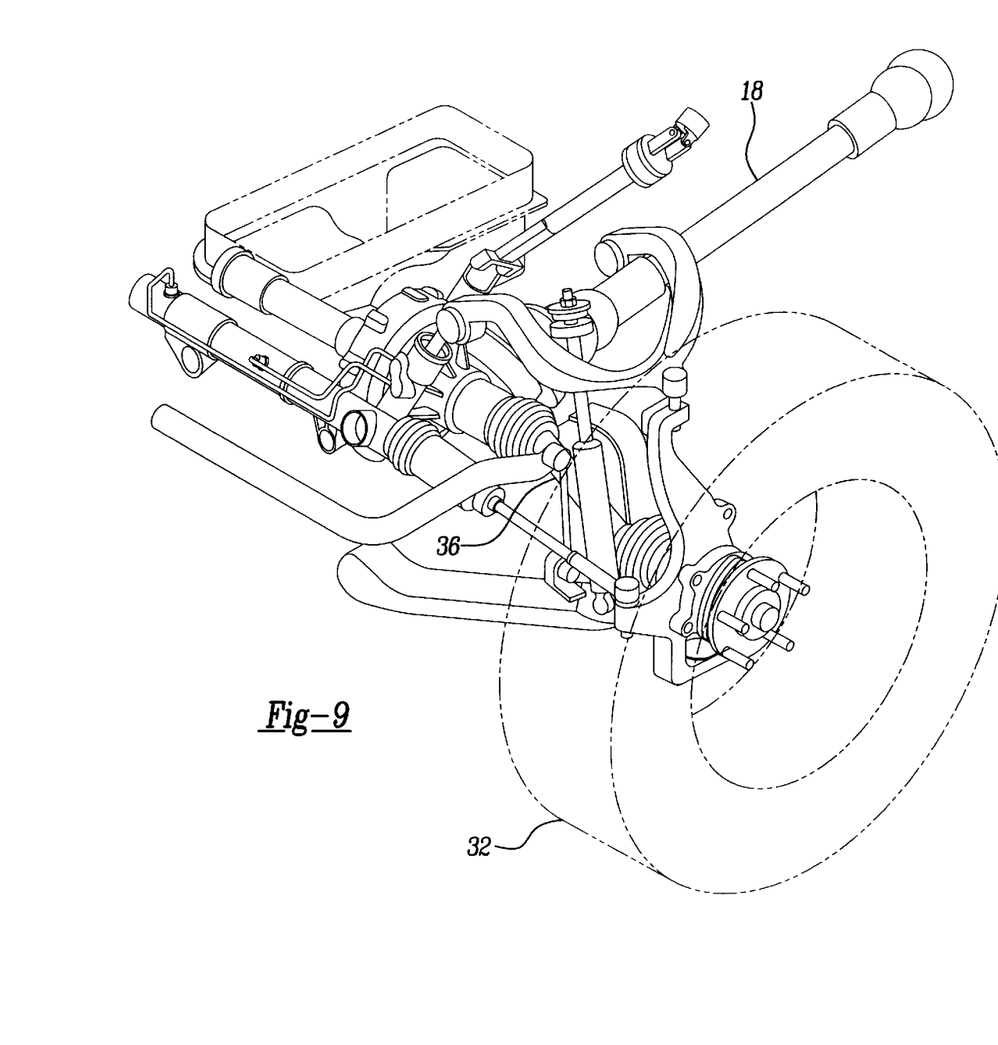
FIG. 9 is a perspective view, similar to FIG. 7, of the front differential assembly.

It should be appreciated that by moving the differential thrust bearings toward the centerline of the vehicle, the size of the differential housing may be minimized. Increased ground clearance of approximately ¾" may be realized by mounting the smaller differential housing higher in the vehicle (see FIG. 9). Moreover, by moving the differential housing higher in the vehicle and the differential thrust bearings further inboard, the half shaft length may be maximized. An increase in half shaft length enables the suspension travel to be increased to approximately 12". Consequently, the present invention is able to overcome the disadvantages of conventional designs and provide a front differential assembly capable of maximizing the vehicle ground clearance and suspension travel.

The invention being thus described, it will be obvious that the same may be varied in many ways. Such variations are not intended as a departure from the spirit and scope of the invention; such modifications as would be obvious to one skilled in the art are intended to be included within the scope of the following claims.

What is claimed is:

1. A differential assembly for a vehicle, said assembly comprising:

a housing;

a differential mechanism rotatably mounted in said housing, said differential mechanism having a differential casing and a support shaft being transversely disposed in said differential casing for supporting a pair of rotating cross gears, a ring gear being fixed to an outer periphery of said differential casing for rotation therewith, and at least one annular sleeve integrally formed with said differential casing extending axially from said differential casing, said rotation of said differential mechanism defining a differential spin axis and a support shaft spin plane;

a pinion gear enmeshing with said ring gear and rotatably driving said differential mechanism, said pinion gear extending from said housing and defining a pinion spin axis, said pinion spin axis being parallel to and offset from said support shaft spin plane; and a pair of opposing bearings rotatably supporting said differential casing, at least one of said bearings being in contact with both an outer surface of said annular sleeve and said housing, one of said pair of bearings intersecting said pinion spin axis.

2. The assembly according to claim 1 wherein said support shaft spin plane is offset from said pinion spin axis in the range of 2.04 to 2.18 inches.

3. The assembly according to claim 1 wherein said pair of opposing bearings is press-fit into said housing.

4. The assembly according to claim 1, further comprising:
   a propeller shaft rotatably coupled to said pinion gear and adapted to be rotatably coupled to the transmission of the vehicle, said propeller shaft having a plan view angle of approximately 0° relative to said pinion spin axis.

5. The assembly according to claim 1, further comprising:
   a yoke being coupled with said pinion gear to form a rotatable unit; and a pre-assembled hub unit supporting said yoke and said pinion gear for rotation.

6. The assembly according to claim 5 wherein said pre-assembled hub unit includes:
   a hub portion removably secured to said housing; and
   a hub bearing disposed in said hub portion, said bearing supporting said yoke and said pinion gear for rotation.

7. The assembly according to claim 6 wherein said pinion gear, yoke, hub portion, and hub bearing form a sub-assembly adapted to be secured as a unit to said housing.

8. A differential assembly for a vehicle having a transmission, said assembly comprising:
   a body;
   a differential mechanism being rotatably mounted in said body, said differential mechanism having a differential casing and a a support shaft being transversely disposed in said differential casing for supporting a pair of rotating cross gears, a bevel gear being fixed to said differential casing for rotation therewith, and at least one axially extended annular portion integrally formed with said differential casing, said rotation of said differential mechanism defining a differential spin axis and a support shaft spin plane;
   an input gear enmeshing with said bevel gear and rotatably driving said differential mechanism and defining an input gear spin axis;
   a yoke being coupled with said input gear for unitized rotation therewith;
   a pre-assembled hub unit supporting said yoke and said input gear for rotation, said hub unit being removably secured to said body such that said input gear spin axis is substantially parallel to and offset from said support shaft spin plane; and
   a pair of opposing bearings rotatably supporting said differential casing, at least one of said pair of bearings being in contact with both an outer surface of said annular portion and said body, one of said pair of bearings intersecting said input gear spin axis.

9. The assembly according to claim 8 wherein the offset of said support shaft spin plane from said input spin axis is between 2.04 to 2.18 inches.

10. The assembly according to claim 8 wherein said pair of opposing bearings is press-fit into said carrier assembly.

11. The assembly according to claim 8, further comprising:
    a propeller shaft rotatably coupled at one end to said yoke and being adapted to be rotatably coupled at the other end to the transmission of the vehicle, said propeller shaft having a plan view angle of approximately 0° relative to said input spin axis.

12. The assembly according to claim 8 wherein said pre-assembled hub unit includes:
    a hub portion removably secured to said body; and
    a bearing disposed in said hub portion, said bearing supporting said yoke and said input gear for rotation.

13. The assembly according to claim 11 wherein said input gear, yoke, hub portion, and bearing form a sub-assembly adapted to be secured as a unit to said body.

14. A differential assembly for a vehicle, said differential assembly comprising:
    a differential housing;
    a differential mechanism rotatably mounted in said differential housing, said differential mechanism being adapted to transmit torque to a pair of driven wheels of the vehicle;
    a pinion gear enmeshing rotatable driving said differential mechanism, said pinion gear extending from said housing and defining a pinion spin axis;
    a pair of thrust bearings rotatably mounted in said differential housing on opposing sides of said differential mechanism, said pair of thrust bearings adapted to rotatably support said differential mechanism, one of said pair of thrust bearings intersecting said pinion spin axis; and
    adjustment means for adjustably controlling backlash and preload in said differential mechanism.

15. The differential assembly according to claim 14 wherein said adjustment means includes a laterally adjustable support adjacent one of said pair of thrust bearings.

* * * * *